United States Patent
Seningen

(10) Patent No.: US 11,755,480 B2
(45) Date of Patent: Sep. 12, 2023

(54) DATA PATTERN BASED CACHE MANAGEMENT

(71) Applicant: Apple Inc., Cupertino, CA (US)

(72) Inventor: Michael R. Seningen, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/929,544

(22) Filed: Sep. 2, 2022

(65) Prior Publication Data

US 2022/0414009 A1    Dec. 29, 2022

Related U.S. Application Data

(63) Continuation of application No. 17/033,587, filed on Sep. 25, 2020, now Pat. No. 11,442,855.

(51) Int. Cl.
  *G06F 12/08*     (2016.01)
  *G06F 12/0802*   (2016.01)

(52) U.S. Cl.
  CPC ...... *G06F 12/0802* (2013.01); *G06F 2212/60* (2013.01)

(58) Field of Classification Search
  CPC ........... G06F 2212/602; G06F 12/0802; G06F 2212/60; G06F 12/1045; G06F 12/1027
  See application file for complete search history.

(56) References Cited

U.S. PATENT DOCUMENTS

| | | | |
|---|---|---|---|
| 9,606,934 B2 | 3/2017 | Acar et al. | |
| 10,019,368 B2 | 7/2018 | Hagersten et al. | |
| 10,282,295 B1 | 5/2019 | Walker et al. | |
| 2003/0105929 A1 | 6/2003 | Ebner et al. | |
| 2003/0127683 A1* | 7/2003 | Yoo | H01L 27/11524 257/315 |
| 2004/0054860 A1 | 3/2004 | Dixit et al. | |
| 2016/0028846 A1 | 1/2016 | Coglitore et al. | |

* cited by examiner

*Primary Examiner* — Jae U Yu
(74) *Attorney, Agent, or Firm* — Kowert, Hood, Munyon, Rankin & Goetzel, P.C.; Scott W. Pape; Dean M. Munyon

(57) ABSTRACT

A cache memory circuit that evicts cache lines based on which cache lines are storing background data patterns is disclosed. The cache memory circuit can store multiple cache lines and, in response to receiving a request to store a new cache line, can select a particular one of previously stored cache lines. The selection may be performed based on data patterns included in the previously stored cache lines. The cache memory circuit can also perform accesses where the internal storage arrays are not activated in response to determining data in the location specified by the requested address is background data. In systems employing virtual addresses, a translation lookaside buffer can track the location of background data in the cache memory circuit.

20 Claims, 14 Drawing Sheets

US 11,755,480 B2

DATA PATTERN BASED CACHE MANAGEMENT

PRIORITY INFORMATION

The present application is a continuation of U.S. application Ser. No. 17/033,587, entitled "Data Pattern Based Cache Management," filed Sep. 25, 2020, the disclosure of which is incorporated by reference herein in its entirety.

BACKGROUND

Technical Field

The embodiments described herein generally relate to computing systems, and more particularly, to cache memory circuits within such systems.

Description of the Relevant Art

Computing systems include multiple processors or processor cores that may retrieve and execute program instructions from memory. The program instructions may be part of software programs or applications, and may be designed to perform particular functions, such as word processing, sending and receiving electronic mail, and the like. During execution of such a software program, instructions included in the software program may send data to, or receive data from one or more devices included in, or coupled to, the computing system. Such data may also be stored and later retrieved from a memory.

To facilitate the retrieval of program instructions, and the storage of data, a computing system may include multiple memories. Such memories may vary in storage capacity as well as in access time. In some computing systems, memories may be arranged in a hierarchical fashion, with smaller, faster memories (referred to as "cache memories") coupled directly to processors or processor cores, and larger, slower memories coupled to the processors or processor cores via a memory management unit and a communication or switch fabric.

Cache memories may store frequently used program instructions and data, so that a processor may quickly retrieve such frequently used information without having to wait for an access to main memory. Since cache memories are limited in storage capacity, periodically infrequently used information is evicted to provide storage for program instructions and data that are used more frequently.

SUMMARY OF THE EMBODIMENTS

Various embodiments of a computing system are disclosed. Broadly speaking, an apparatus and a method are contemplated in which a memory circuit is configured to store multiple cache lines. A control circuit is configured to receive a request to store a new cache line in the memory circuit. In response to receiving the request, the control circuit is configured to select a previously stored cache line based on respective data patterns included in the cache lines stored in the memory circuit. In some cases, the previously stored cache line is selected in response to determining the previously stored cache line is storing a background data pattern. The control circuit is configured to evict the selected cache line and store the new cache line at a location within the memory circuit previously occupied by the selected cache line. By selecting cache lines for eviction based on which cache lines are storing background data rather than frequency of use of the cache line, a cache memory circuit can trade off system performance for a reduction in power consumption.

DETAILED DESCRIPTION OF EMBODIMENTS

Figure 1:
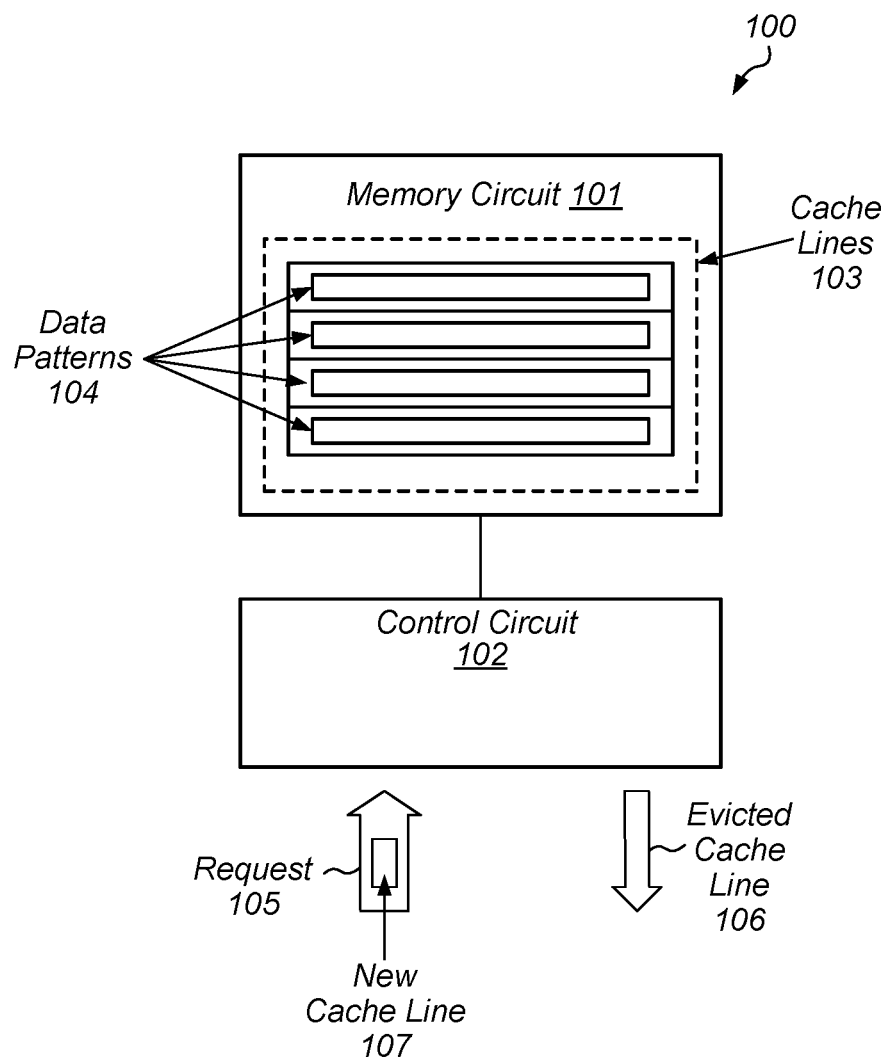
FIG. 1 is a generalized block diagram of an embodiment of a cache memory circuit.

Computer systems often employ a hierarchy of memory circuits, with smaller capacity, higher performing memory circuits located in close proximity to processor circuits. During operation of a computing system, the various memory circuits may store a variety of data relating to operands, instructions, graphics, or other visual data, and the like.

In some cases, particular data patterns may be repeatedly stored in (and subsequently read from) a particular memory circuit, or a portion thereof. Such frequently encountered data patterns can result from processing certain types of data. For example, graphics data may include a large of amount of data relating to pixels of a given color. As such data is processed, a memory circuit can become "full" of one or more of these frequently encountered data patterns (referred to as "background data patterns"), leaving the memory circuit sparsely populated with other data patterns amidst the background data patterns. As used and defined herein, a background data pattern is a data pattern that consumes a threshold storage capacity of a given memory circuit.

As more and more of storage locations within a memory are filled with a background data pattern, subsequent read accesses to the memory circuit are increasingly likely to access a storage location where the background data pattern is stored, resulting in many accesses that output the same data pattern. As described below, noting storage locations where the background data pattern is stored, accesses to those storage locations can be simplified, resulting in a power savings, particularly to frequently accessed memory circuits, such as cache memory circuits.

Cache memory circuits are employed in computer systems to store frequently used program instructions and data for a processor circuit. By storing frequently used program instructions and data, a computer system can avoid delays associated with accesses to main memory, thereby improving performance. Stored information in a cache memory circuit is organized in "cache lines" that include multiple bits. In some cases, a cache line may store a single program instruction, an operand, or any other suitable type of data.

As a processor circuit fetches program instructions or data from a cache memory circuit, periodically, requested information may not be stored in the cache memory circuit. When requested information is not stored in the cache memory circuit, it is referred to as a "cache miss," and the cache memory circuit will forward the request onto a higher-level memory. Upon receiving the request, the higher-level memory will send the requested information to the cache memory circuit. If there is space available in the cache memory circuit, the requested information will be stored in an available cache line. If, however, there are no available cache lines in the cache memory circuit, a currently stored cache line is evicted to make room for the requested information received from the higher-level memory.

To maintain frequently used program instructions or data in a cache memory circuit, cache lines are typically selected for eviction based on frequency of use. In some cases, a given cache line that has a lowest number of accesses, i.e., it is the least frequently used cache line, is selected for eviction. When a selected cache line is evicted, a check is made to determine if the selected cache line has been modified while it has been stored in the cache memory circuit. If the selected cache line has been modified, then a "write back" operation is performed, where the selected cache line is written back to a higher-level memory before it is evicted from the cache memory circuit in order to preserve the changes made to the selected cache line.

Such cache eviction techniques generally prioritize performance over power consumption. By selecting infrequently used cache lines for eviction, the likelihood of creating a cache miss is reduced. Cache misses result in additional latency during fetch operations performed by a processor, which can reduce the performance of the processor. In some computer systems, however, power consumption may be a higher priority than processor performance. Techniques in the present disclosure are based on the recognition that cache memory circuit write back operations present an opportunity for power savings. When a cache memory circuit is storing one or more background data patterns, a different method of selecting cache lines for eviction is possible. Such a method is based on which cache lines are storing one of the background data patterns. Rather than evicting cache lines on the basis of frequency of use, cache lines are selected for eviction based on which cache lines are storing the background data patterns.

During a write back operation, a cache line selected for eviction must be read and the stored data sent to a higher-level memory for storage. If, however, the selected cache line is storing a background data pattern, there is no need to read the selected cache line, nor send it to the higher-level memory. Rather than sending an entire cache line to the higher-level memory, a signal is sent to the higher-level memory indicating that the background pattern is to be used. By sending a signal as opposed to reading and sending an entire cache line of data, a power savings is realized. The embodiments illustrated in the drawings and described below may provide techniques for selecting and evicting cache lines from a cache memory circuit that realize these power savings.

An embodiment of a cache memory circuit is depicted in FIG. 1. As illustrated, cache memory circuit 100 includes memory circuit 101 and control circuit 102. In various embodiments, cache memory circuit 100 may be coupled to a processor circuit and configured to store frequently used program instructions or data.

Memory circuit 101 is configured to store cache lines 103. As described below, memory circuit 101 may include multiple banks, each of which may store a subset of the plurality of cache lines. In some cases, data stored in the cache lines may be directly mapped with a higher-level memory circuit, or the mapping between the cache lines in memory circuit 101 and the higher-level memory circuit may be associative.

Control circuit 102 is configured to receive a request 105 to store new cache line 107 in memory circuit 101. In various embodiments, request 105 may be the result of a "cache miss," where a processor circuit requested new cache line 107, but it was unavailable in cache memory circuit 100. In response to the miss, new cache line 107 was retrieved from a higher-level memory circuit, and sent to cache memory circuit 100 for storage.

In many cases, a selection of which cache line to evict is based on a frequency of use. For example, when space is needed in a cache memory, the least frequently used cache line is selected for eviction. Rather than using frequency of use, control circuit 102 is configured, in response to a determination that memory circuit 101 is full, to select a previously stored cache line of cache lines 103 based on data patterns 104. In various embodiments, control circuit 102 may be configured to select a cache line that is storing a background data pattern. It is noted that, in some cases, multiple background data patterns may be allowed, and control circuit 102 may use additional information (e.g., frequency of use) in addition to the background data pattern to select a cache line for eviction.

Control circuit 102 is also configured to evict a selected cache line from memory circuit 101. In cases where the selected cache line has been modified since it was stored in memory circuit 101, control circuit 102 may perform a write back operation as part of the eviction. To perform the write back operation, the control circuit is further configured to write the current contents of the selected cache line back to a higher-level memory to preserve the modifications to the selected cache line. Control circuit 102 is also configured to store new cache line 107 in memory circuit 101 at a location previously occupied by the selected cache line.

Figure 2:
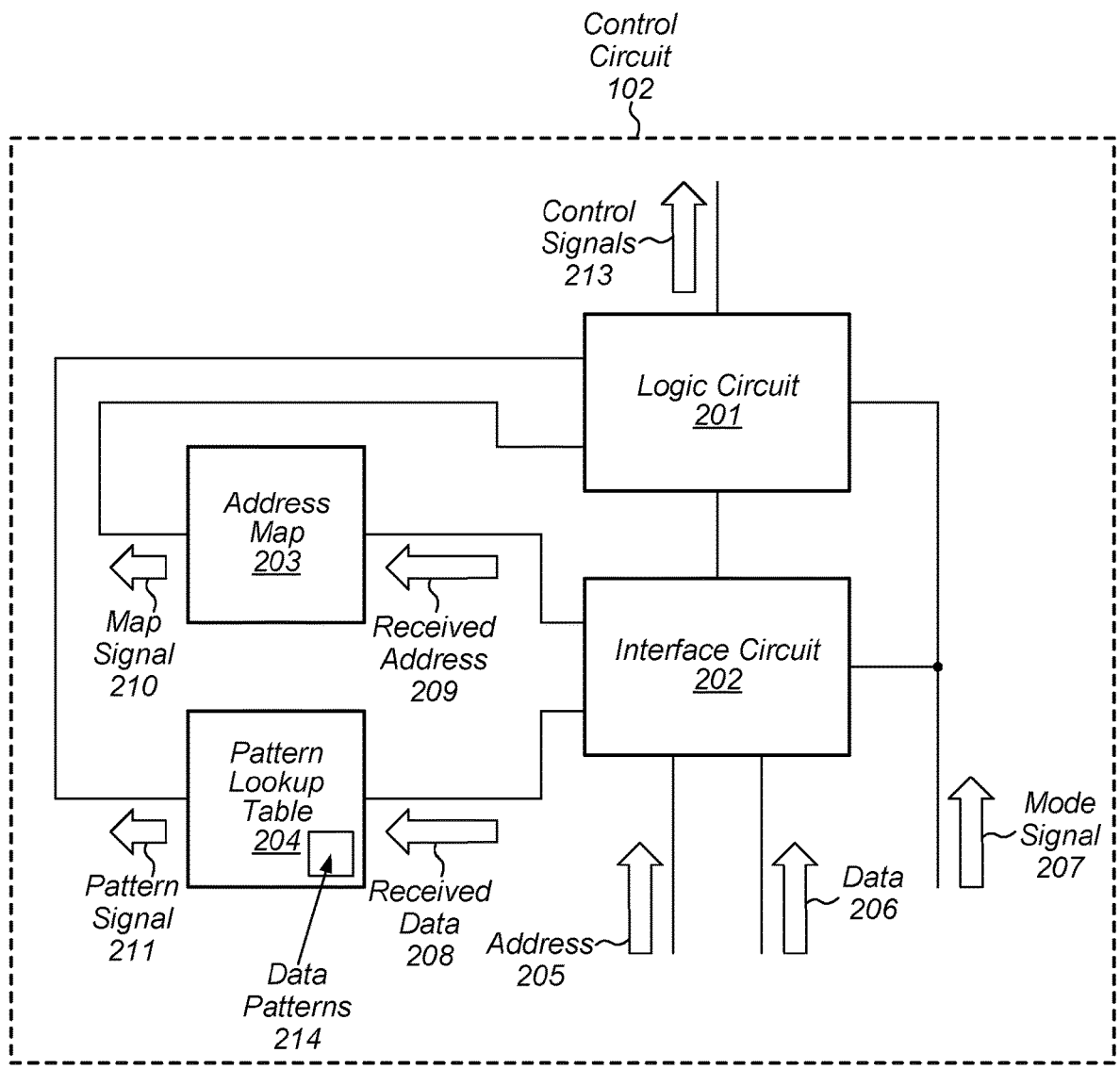
FIG. 2 illustrates a block diagram depicting an embodiment of a cache memory control circuit.

A block diagram of an embodiment of control circuit 102 is depicted in FIG. 2. As illustrated, control circuit 102 includes logic circuit 201, interface circuit 202, address map 203, and pattern lookup table 204.

Interface circuit 202 is configured to receive address 205 and data 206, to send received data 208 to pattern lookup table 204 and to send received address 209 to address map 203. During a write operation (as indicated by mode signal 207), interface circuit 202 will receive both address 205 and data 206, where address 205 corresponds to a location in which to store data 206. During a read operation, interface circuit 202 will receive just address 205, which corresponds to a location from which to retrieve previously stored information.

Pattern lookup table 204 is configured to store data patterns 214. In various embodiments, data patterns 214 may include one or more background data patterns. Data patterns 214 may be stored during an initialization or boot-up operation. Alternatively, data patterns 214 may be modified (data patterns may be added or removed from pattern lookup table 204) under the control of logic circuit 201. In some cases, the modification of data patterns 214 may be based on data tracking of data patterns that are frequently encountered during memory accesses. In other cases, different sets of data patterns may be stored in pattern lookup table 204 based on a type of software or program instructions being executed by a computer system. For example, when executing video-related program instructions, the computer system may benefit from using one set of data patterns, while when executing audio-related program instructions, the computer system may benefit from another set of data patterns. In various embodiments, pattern lookup table 204 may be implemented as a content-addressable memory (CAM) circuit, or other suitable storage circuit.

Address map 203 is configured to compare received address 209 against previously stored addresses to generate map signal 210. In various embodiments, the addresses included in address map 203 correspond to locations in memory circuit 101 where background data patterns are stored. During a write operation, when data 206 corresponds to one of the data patterns included in pattern lookup table 204, received address 209 will be added to address map 203. In response to a location in memory circuit 101 corresponding to an address in address map 203 being written with a data pattern not included in pattern lookup table 204, the corresponding address is removed from address map 203. In various embodiments, address map 203 may be implemented as a register file, content-addressable memory, or any other suitable storage circuit.

Logic circuit 201 is configured to generate control signals 213 using map signal 210, pattern signal 211, and mode signal 207. As described above, map signal 210 indicates that received address 209 matches an address storing one of data patterns 214, and pattern signal 211 indicates that received data 208 matches one of data patterns 214. Mode signal 207 indicates whether an operation for cache memory circuit 100 is either a read operation or a write operation. In the case of a read from an address location storing a background data pattern, logic circuit 201 is configured to set control signals 213 such that memory circuit 101 is held in pre-charge. In the case of a write operation involving background data, logic circuit 201 is configured to set control signals 213 to hold memory circuit 101 in pre-charge. If a read or write operation does not involve any of the background data patterns, logic circuit 201 generates control signals 213 such that memory circuit 101 performs the requested operation.

Logic circuit 201 is also configured to select one of cache lines 103 for eviction. In some cases, logic circuit 201 may base the selection on data patterns 104 included in cache lines 103. In some embodiments, logic circuit 201 may examine addresses stored in address map 203 to determine which cache lines are storing data that matches data patterns 214. As described below, logic circuit 201 may use status bits stored adjacent to corresponding ones of cache lines 103. In some cases, logic circuit 201 may be able to switch eviction algorithms based on performance requirements for a computer system.

Some computer systems employ management circuits, or execute software, to monitor operational characteristics (e.g., power dissipation, temperature, etc.) of the system. Based on the operational characteristics, the management circuit (or software) may change operating parameters (e.g., clock frequency, power supply voltage level, etc.) of the system. For example, if power dissipation of the computer system exceeds a threshold value, logic circuit 201 may be instructed to switch to an eviction algorithm based on background data in cache lines 103. If, however, system performance is a priority, logic circuit 201 may select a least frequently used eviction algorithm. It is noted that in some embodiments, some of the above-described functionality of logic circuit 201 may be in whole, or in part, located in a translation lookaside buffer coupled to cache memory circuit 100 and a processor circuit. In various embodiments, logic circuit 201 may be implemented as a microcontroller, state machine, or other suitable sequential logic circuit.

Figure 3:
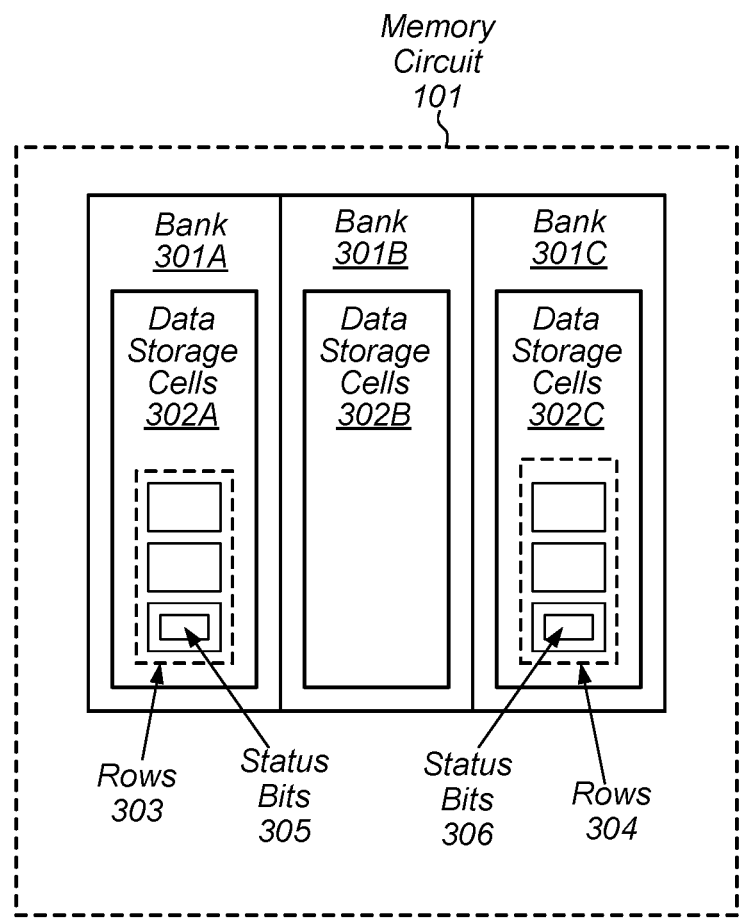
FIG. 3 illustrates a block diagram depicting an embodiment of a memory circuit used in a cache memory circuit.

Turning to FIG. 3, a block diagram of an embodiment of memory circuit 101 is depicted. As illustrated, memory circuit 101 includes banks 301A-C. In various embodiments, banks 301A-C may be operated independently. That is, one of banks 301A-C may be performing a read or write operation, while the remaining ones of banks 301A-C are in a pre-charge or power down state. Although only three banks are depicted in the embodiment of FIG. 3, in other embodiments, any suitable number of banks may be employed.

Bank 301A includes data storage cells 302A, while banks 301B and 301C include data storage cells 302B and 302C, respectively. Data storage cells 302A-C may be arranged in rows. For example, data storage cells 302A are arranged in rows 303, while data storage cells 302C are arranged in rows 304. In some cases, a number of data storage cells included in a given row may correspond to a number of bits included in a given one of cache lines 103. It is noted that within a given one of banks 301A-C, only a single row may be active at any given time. In various embodiments, data storage cells 302A-C may be implemented as static random-access memory (SRAM) storage cells, dynamic memory cells, or any suitable type of data storage cell capable of storing information indicative of a logic value.

In some cases, one or more rows within the data storage cells of banks 301A-C may be storing a background data pattern included in pattern lookup table 204. Different techniques may be employed to determine if a given row is storing a background pattern. To avoid reading the given row and checking the read results, additional bits (referred to as "status bits") included in the particular row may be checked. For example, one of rows 303 includes status bits 305, while one of rows 304 include status bits 306. Such status bits may be set when data is written (or stored) in a given row within memory circuit 101.

The values of status bits 305 and 306 indicate if their respective rows include one of the patterns included in pattern lookup table 204. In some cases, where only a single pattern is employed, status bits 305 and 306 may be a single bit. Alternatively, if multiple patterns are employed, status bits 305 and 306 may encode a corresponding pattern stored in their respective rows.

Figure 4:
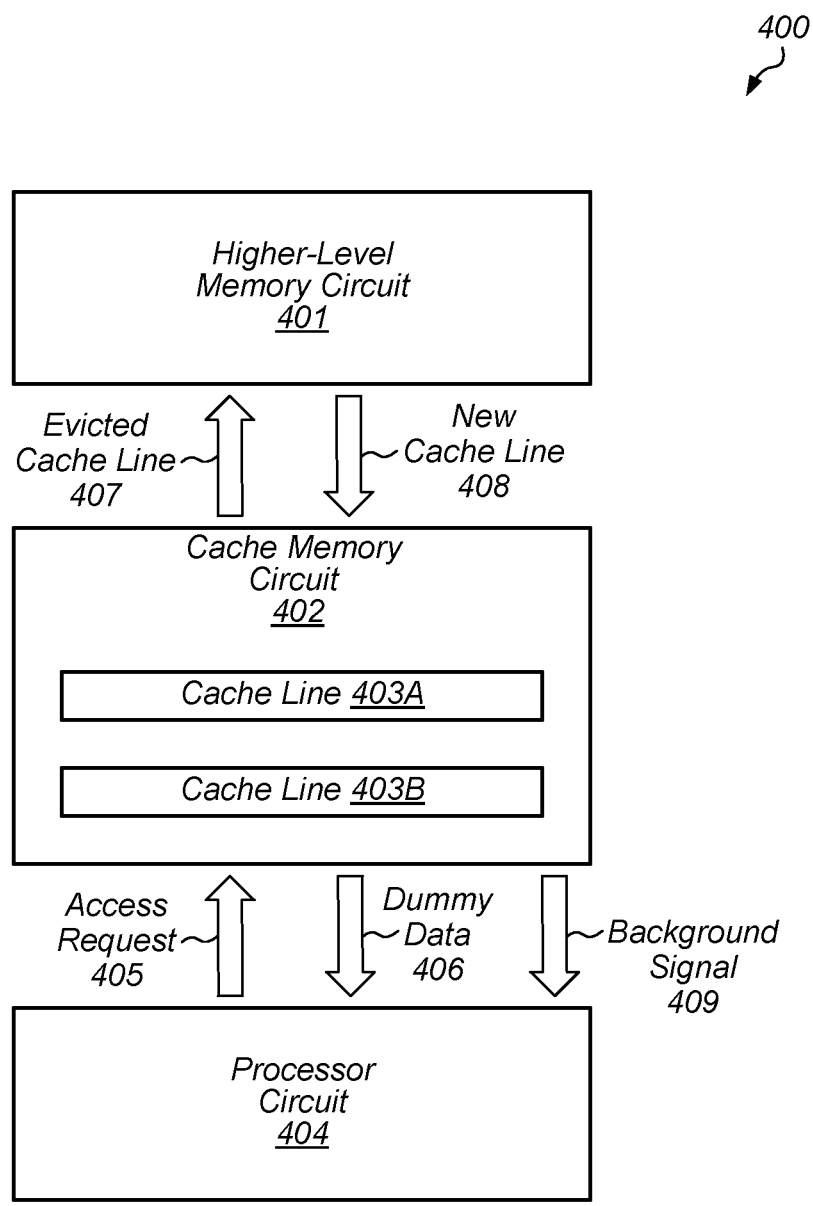
FIG. 4 illustrates a block diagram of a computer system.

Turning to FIG. 4, a block diagram of a computer system is depicted. As illustrated, computer system 400 includes higher-level memory circuit 401, cache memory circuit 402, and processor circuit 404.

Processor circuit 404 is configured to fetch data or instructions from cache memory circuit 402. In various embodiments, processor circuit 404 may be implemented as a general-purpose processor configured to execute software or program instructions.

Cache memory circuit 402 is configured to store cache lines 403A and 403B. In various embodiments, cache memory circuit 402 may correspond to cache memory circuit 101 as depicted in FIG. 1. Cache lines 403A-B may be either instructions for processor circuit 404, or data to be operated upon by processor circuit 404. The size (i.e., a number of bits) of cache lines 403A-B may be selected based on a type of data being stored in cache memory circuit 402. For example, if cache memory circuit 402 is storing instructions, the size of cache lines 403A-B may be based on a number of bits included in an instruction. In some cases, cache lines 403A-B may span multiple bank or blocks (e.g., banks 301A-C as depicted in FIG. 3) or they made be stored within a single bank or block. Although cache memory circuit 402 is depicted as storing two cache lines, in other embodiments, cache memory circuit 402 may store any suitable number of cache lines based on an available amount of storage in cache memory circuit 402.

Cache memory circuit 402 is also configured, in response to receiving access request 405 from processor circuit 404, to check a cache line specified in access request 405 (e.g., cache line 403A) to determine if data stored in the specified cache line matches a background data pattern.

If the cache line specified in access request 405 is not stored in cache memory circuit 402, access request 405 may be forwarded onto higher-level memory, which will send the specified cache line to cache memory circuit 402 as new cache line 408. Cache memory circuit 402 is configured to check for an available storage location. If no storage locations are available, cache memory circuit 402 is configured to evict a previously stored cache line (e.g., cache line 403B) to make space for new cache line 408. In various embodiments, cache memory circuit 402 may be configured to select the previously stored cache line based on respective data patterns in the previously stored cache lines or based on an energy consumption that will result from an eviction of a given one of the previously stored cache lines.

Cache memory circuit 402 is also configured, in response to a determination that the cache line specified in access request 405 is stored in cache memory circuit 402, to check the data stored in the specified cache line. If the data stored in the specified cache line is the background data pattern, cache memory circuit 402 is configured to send background signal 409 to processor circuit 404. In various embodiments, processor circuit 404 is configured to interpret background signal 409 as the background data itself without cache memory circuit 402 having to send the background data pattern, thereby saving the energy associated with transmitting the background data.

Alternatively, cache memory circuit 402 may be configured to transmit dummy data 406 to processor circuit 404, in response to a determination that the data stored in the specified cache line is background data. Dummy data may be any suitable data pattern that corresponds to the background data pattern and can be used to obfuscate or hide the background data pattern. Dummy data may be generated by performing a hash operation on the background data pattern, or may be predetermined and loaded into a register for use. In such cases, processor circuit 404 is configured to interpret dummy data 406 as the background data pattern upon receipt of the data. In various embodiments, another control signal (e.g., background signal 409) may be sent in addition to dummy data 406 in order to indicate to processor circuit 404 that the data being received is dummy data. By mapping the background data pattern to a dummy data pattern, any monitoring of a data bus between cache memory circuit 402 and processor circuit 404 will yield obfuscated results making hacking, reverse engineering, etc., difficult to perform.

Higher-level memory circuit 401 is configured to store instructions and data. In various embodiments, higher-level memory circuit 401 may be implemented as a static random-access memory (SRAM) circuit, a dynamic random-access memory (DRAM) circuit, or any other suitable type of memory circuit. In computer systems that employ a hierarchy of memory circuits, higher-level memory circuit 401 may itself be a cache memory circuit with similar capabilities as those described above in regard to cache memory circuit 100.

As described above, memory circuits, including cache memory circuits, often store many instances of a particular data pattern (e.g., a background data pattern). Since such data patterns do not actually have to be stored in memory (only the locations in the address space need to be noted), some of the storage locations within a memory circuit, are available for storing other data. As such, a memory circuit can appear to have a larger storage capacity than it does, provided at least a portion of the data stored in the memory is background data.

Figure 5:
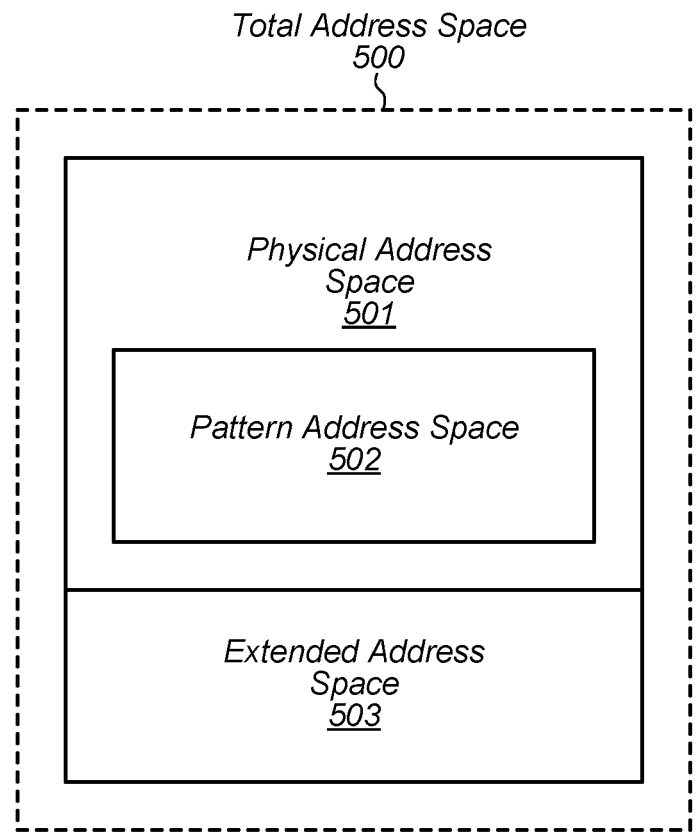
FIG. 5 illustrates a block diagram of an address space associated with a cache memory circuit.

Turning to FIG. 5, a block diagram of an embodiment of an address space of a memory circuit is depicted. As illustrated, total address space 500 includes physical address space 501 and extended address space 503. It is noted that total address space 500 may correspond to the total address space of memory circuit 101 as depicted in FIG. 1.

Physical address space 501 corresponds to physical storage locations within a memory circuit. Included in the physical address space is pattern address space 502. The addresses included in pattern address space 502 correspond to locations where the background data pattern is stored. As described above, the actual background data pattern need not be stored in the locations specified by the addresses in pattern address space 502. Since the data storage cells correspond to the locations specified in the pattern address space, those data storage cells can be used to store other non-background data.

To extend the address space, control circuit 102 is configured to map extended address space 503 to the physical location associated with pattern address space 502. When a read access request is received that includes an address in the pattern address space, control circuit 102 is configured to return the background data pattern and not activate memory circuit 101. If, however, the address included in the read access request is included in the extended address space, control circuit 102 is configured to translate the received address to a corresponding address in physical address space 501 and initiate a read operation on memory circuit 101 using the translated address. By mapping addresses in this fashion, memory circuit 101 can appear to be physically larger than it actually is, which can allow for a cache memory to include more entries while maintaining the same physical size.

In some computer systems, a processor circuit employs a virtual address space that is different from the physical address space of the memory circuits used to store program instructions and data. In order for a cache memory circuit to provide the processor with a requested cache line, a virtual address associated with the requested cache line needs to be translated to the physical address space of the cache memory circuit. Such a translation is typically performed by a translation lookaside buffer that maintains a map of virtual to physical addresses. Once a corresponding physical address is found for the virtual address, the translation lookaside buffer sends the corresponding physical address to the cache memory circuit.

Using the disclosed techniques, a translation lookaside buffer can be modified to check for particular data patterns as part of the virtual-to-physical address translation performed by the translation lookaside buffer. By combining the address translation with the virtual-to-physical address translation, a time penalty associated with checking for background data is reduced.

Figure 6:
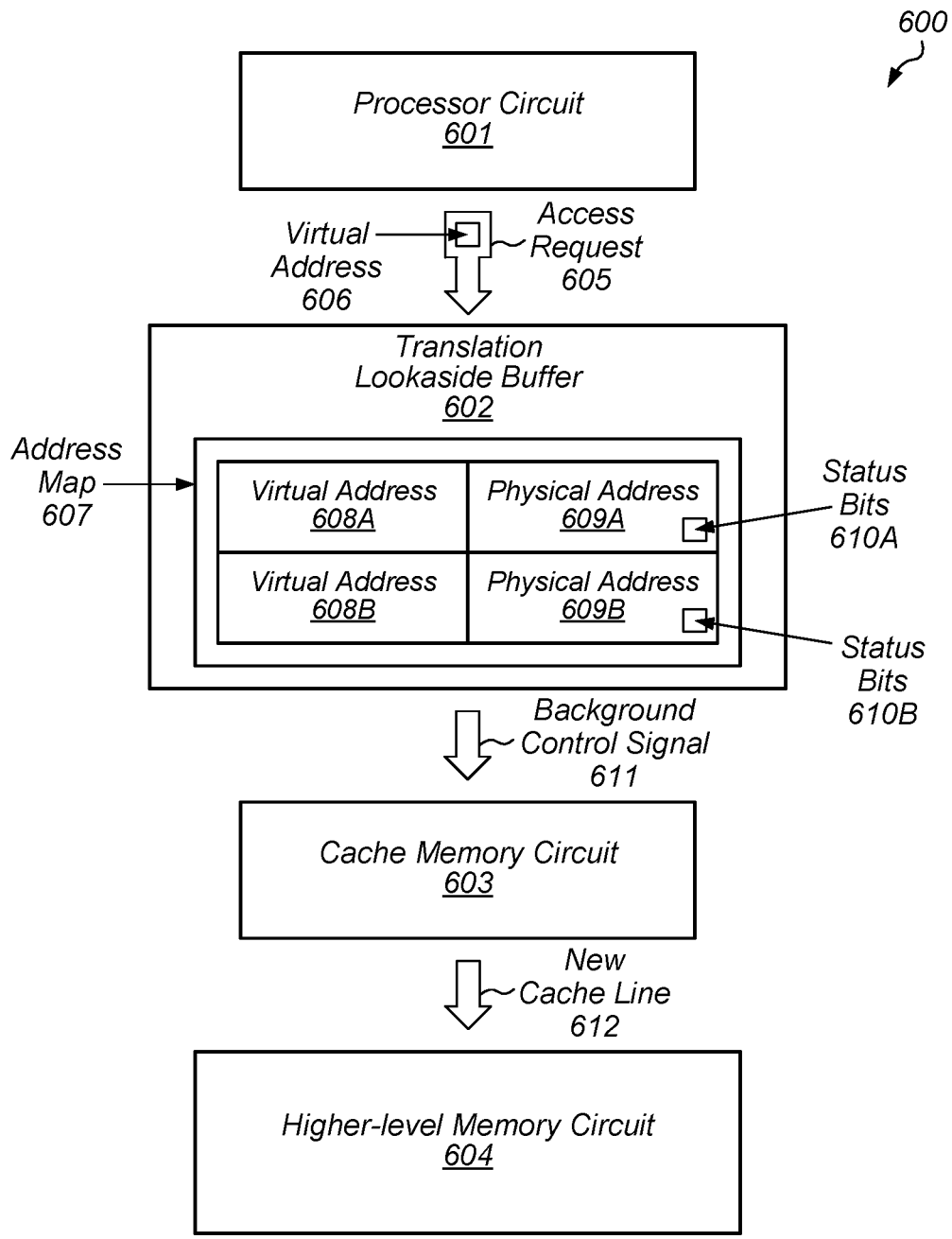
FIG. 6 illustrates a block diagram of a computer system employing a translation lookaside buffer.

Turning to FIG. 6, an embodiment of a computer system employing a translation lookaside buffer is depicted. As illustrated, computer system 600 includes processor circuit 601, translation lookaside buffer 602, cache memory circuit 603, and higher-level memory circuit 604.

Processor circuit 601 is configured to generate access request 605 that includes virtual address 606. In various embodiments, the access request may be for a cache line that includes a program instruction or data needed to perform an operation. In various embodiments, processor circuit 601 may be a central processing unit (CPU), a graphics processing unit (GPU), a microcontroller, or the like, implemented as an application-specific integrated circuit (ASIC), or a field-programmable gate array (FPGA).

Translation lookaside buffer 602 is configured to store address map 607. Address map 607 maps virtual addresses to physical addresses. For example, virtual address 608A is mapped to physical address 609A, and virtual address 608B is mapped to physical address 609B. It is noted that although only two entries are depicted in address map 607, in other embodiments, any suitable number of entries may be stored in address map 607. The physical addresses included in address maps 607 each include status bits. For example, physical address 609A includes status bits 610A and physical address 609B includes status bits 610B. Both status bits 610A and 610B encode information indicative of whether or not data stored in cache memory circuit 603 at locations specified by physical addresses 609A and 609B, respectively, is background data. In some cases, status bits 610A and 610B may be decoded to determine which ones of possible background data patterns are stored in the locations specified by physical addresses 609A and 609B.

In response to receiving access request 605, translation lookaside buffer 602 is configured to compare virtual address 606 to virtual addresses included in address map 607 (e.g., virtual addresses 608A-B). Translation lookaside buffer 602 is also configured, in response to a determination that virtual address 606 matches a particular virtual address in address map 607 (e.g., virtual address 608A), to check status bits associated with a corresponding physical address. For example, translation lookaside buffer 602 will check status bits 610A after determining that virtual address 606 matches virtual address 608A.

Cache memory circuit 603 is configured to perform a background access in response to receiving background control signal 611 from translation lookaside buffer 602. As used and defined herein, a "background access" is an access to a memory circuit, in which arrays of data storage cells included in the memory circuit are not activated, and the memory circuit returns a background data pattern. Cache memory circuit 603 is also configured to send a request to higher-level memory circuit 604, in response to a determination that it is not storing a cache line requested in access request 605. When higher-level memory circuit 604 returns new cache line 612, cache memory circuit 603 may perform an eviction operation as described above. In various embodiments, cache memory circuit 603 may correspond to cache memory circuit 100 as depicted in FIG. 1.

Higher-level memory circuit 604 is configured to store program instructions and data. In response to receiving a request from cache memory circuit 603 resulting from a cache miss, higher-level memory circuit 604 is configured to send new cache line 612 to cache memory circuit 603. In various embodiments, higher-level memory circuit 604 may be implemented as a static random-access memory (SRAM), a dynamic random-access memory (DRAM), or any other suitable type of memory. In the cases of a memory system with multiple levels of hierarchy, higher-level memory circuit 604 may itself be implemented as a cache memory circuit.

Although the techniques described above have been generally directed to cache memory circuits, similar techniques may also be applied to non-volatile memories in order to extend the life of such non-volatile memories.

Non-volatile memory circuits are used in a variety of applications (e.g., mobile devices) to maintained stored data when power is unavailable. Many non-volatile data storage cells, however, can only be written a certain number of times before failure. In some cases, non-volatile memory controllers may move data around a non-volatile memory array (in a process referred to as "wear leveling") to keep some cells from being written more than others. The use of background data provides an alternative to such schemes.

Figure 7:
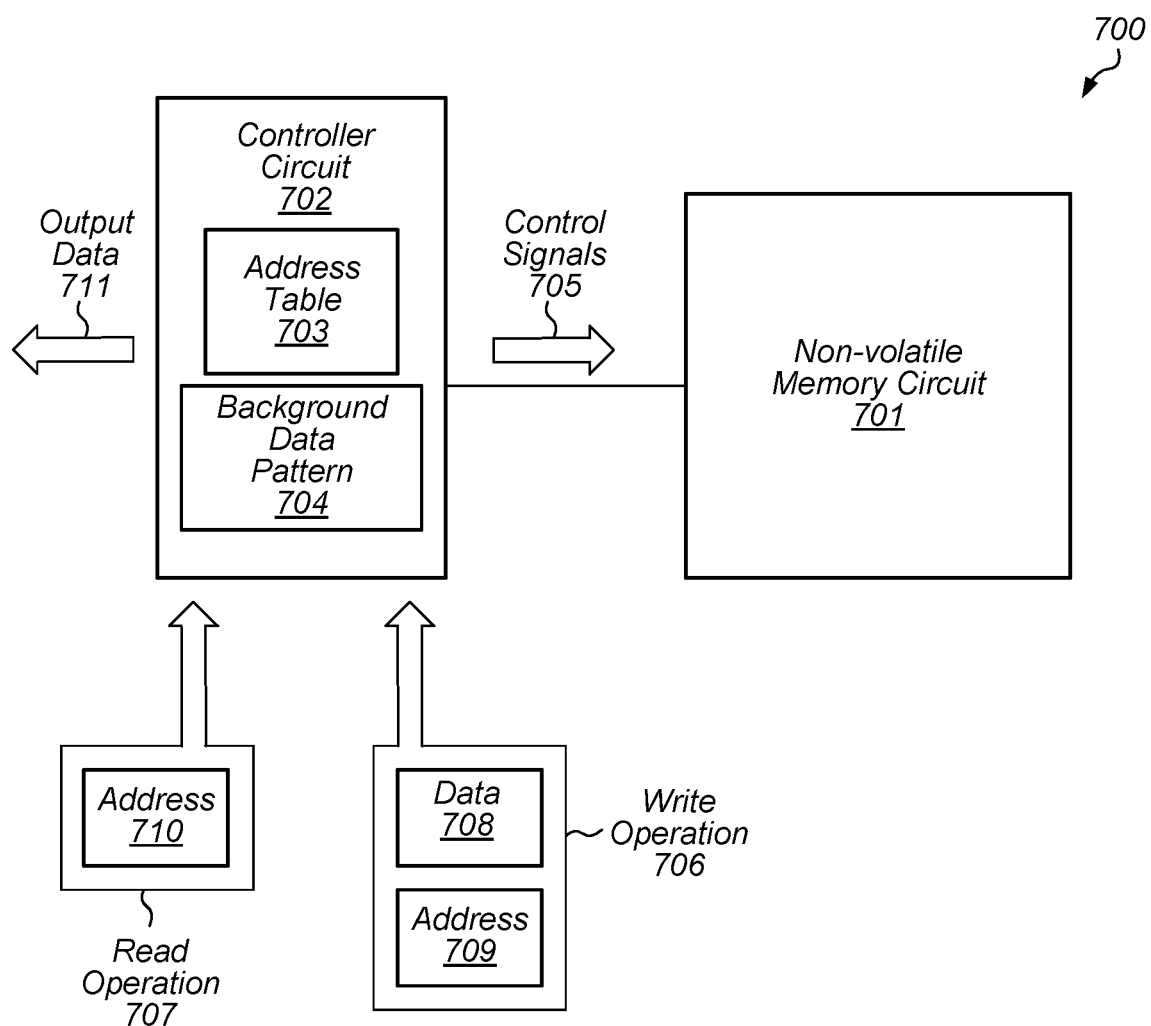
FIG. 7 illustrates a block diagram of a non-volatile memory system.

Turning to FIG. 7, a block diagram of an embodiment of a non-volatile memory system is depicted. As illustrated, non-volatile memory system 700 includes non-volatile memory circuit 701 and controller circuit 702. In various embodiments, non-volatile memory circuit 701 may be implemented as a flash memory circuit, an electrically erasable programmable read-only memory (EEPROM), or any other suitable non-volatile memory circuit.

Non-volatile memory circuit 701 may include multiple non-volatile data storage cells configured to store data. In some cases, a single non-volatile data storage cell may store a single bit, while in other cases, multiple bits may be stored in a single non-volatile data storage cell.

In response to receiving write operation 706, controller circuit 702 is configured to compare data 708 against background data pattern 704. If data 708 is the same as background data pattern 704, controller circuit 702 is configured to store address 709 in address table 703, and generate control signals 705 such that non-volatile memory circuit 701 is placed into pre-charge state. Alternatively, if data 708 is different from background data pattern 704, controller circuit 702 is configured to generate control signals 705 such that data 708 is written into non-volatile memory circuit 701. Although a single background data pattern is described, in other embodiments, multiple data patterns may be employed.

In response to receiving read operation 707, controller circuit 702 is configured to compare address 710 to entries in address table 703. If address 710 matches an entry in address table 703, controller circuit 702 is configured to set output data 711 to background data pattern 704, and generate control signals 705 such that non-volatile memory circuit remains in a pre-charge state. Alternatively, if address 710 does not match an entry in address table 703, controller circuit 702 is configured to generate control signals 705 such that non-volatile memory circuit 701 reads data from a location specified by address 710, and set output data 711 to the data read from non-volatile memory circuit 701.

Figure 8A:
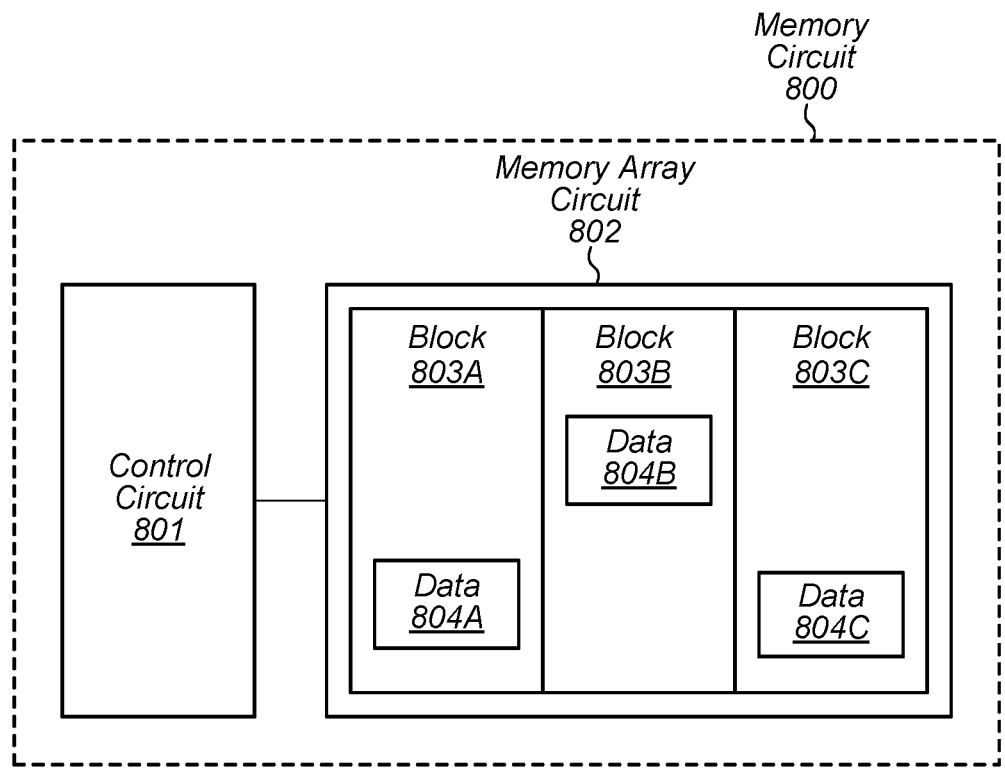
FIG. 8A illustrates a block diagram of a memory circuit before a pattern collection operation has been performed.
Figure 8B:
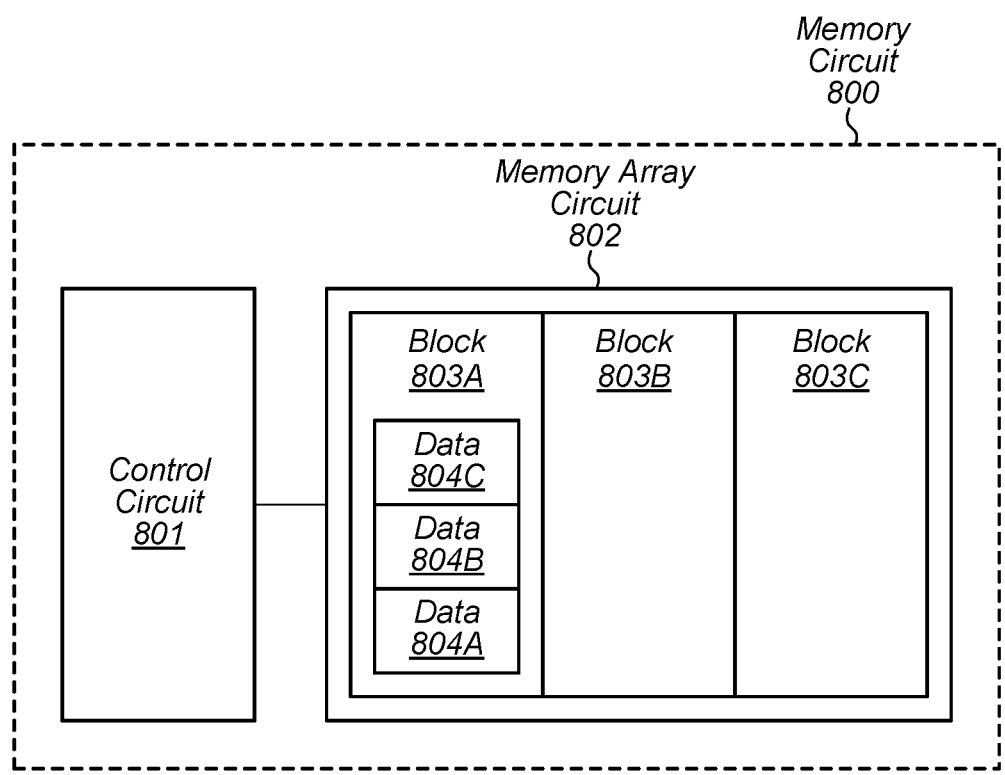
FIG. 8B illustrates a block diagram of a memory circuit after a pattern collection operation has been performed.

In some cases, background data patterns are stored in different blocks within a memory array circuit. By collecting all of the background data patterns into a single block, the block can be powered down to conserve energy. FIGS. 8A and 8B illustrate such a data pattern collection operation.

Turning to FIG. 8A, memory circuit 800 includes control circuit 801 and memory array circuit 802 that includes blocks 803A-803C. As illustrated, data 804A is stored in block 803A, while data 804B is stored in block 803B. In a similar fashion, data 804C is stored in block 803C. In various embodiments, each of data 804A-804C may correspond to a background data pattern. It is noted that although memory array circuit 802 is depicted as including only three blocks, in other embodiments, any suitable number of blocks may be employed.

FIG. 8B also depicts memory circuit 800, but after a pattern collection operation has been performed. In various embodiments, control circuit 801 is configured to search for a background data pattern in each of blocks 803A-803C. Upon detection of the background data pattern, control circuit 801 is further configured to relocate the background data pattern to a target block (e.g., block 803A). It is noted, that control circuit 801 may not actually read the data from one block and write the read data to the target block, but merely update an address map (e.g., address map 203), to map an address corresponding to the location of the background data pattern to a different address location in the target block.

As illustrated, once the pattern collection operation has been performed, data 804A-804C are stored in block 803A. Since block 803A is not storing just the background data pattern, block 803A may be powered down to conserve power. In various embodiments, since control circuit 801 can return the background data pattern for any access to block 803A, a power supply node may be de-coupled from block 803A. In response to a write to block 803A of a non-background data pattern, control circuit 801 may power up block 803A to allow the write operation. It is noted that such pattern collection operations may be scheduled periodically, or they may be performed prior to other system events (e.g., entry into a sleep mode).

Figure 9:
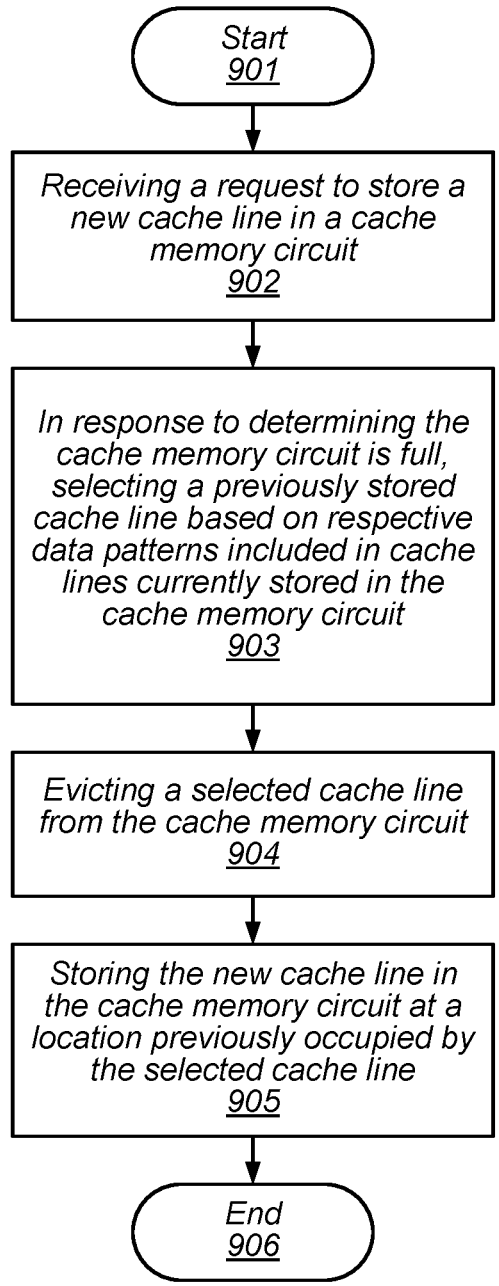
FIG. 9 illustrates a flow diagram depicting an embodiment of a method for evicting an entry in a cache memory circuit.

Turning to FIG. 9, a flow diagram depicting an embodiment of a method for evicting an entry in a cache memory circuit is illustrated. The method, which may be applied to cache memory circuit 100, begins at block 901.

The method includes receiving a request to store a new cache line in a cache memory circuit (block 902). In various embodiments, the request to store the new cache line is received from a higher-level memory circuit, which is returning the new cache line in response to a miss associated with a previous access to the cache memory circuit.

The method also includes, in response to determining the cache memory circuit is full, selecting a previously stored cache line for eviction based on respective data patterns included in cache lines currently stored in the cache memory circuit (block 903). In various embodiments, selecting the previously stored cache line includes determining if a given cache line of the cache lines currently stored in the cache memory circuit includes a background data pattern. In other embodiments, selecting the previously stored cache line includes determining an amount of energy an eviction (with a write back to a higher-level memory circuit) of a given cache line will consume based on a data pattern stored in the given cache line. In such cases, the method may also include selecting a given cache line with a lowest write-back energy consumption for eviction.

The method further includes evicting a selected cache line from the cache memory circuit (block 904). In various embodiments, evicting the selected cache line includes identifying an address associated with the selected cache line as being available for a write operation.

The method also includes storing the new cache line in the cache memory circuit (block 905). In some embodiments, storing the new cache line includes writing data associated with the new cache line in a storage location in the cache memory circuit specified by the address of the evicted cache line. The method concludes in block 906.

Figure 10:
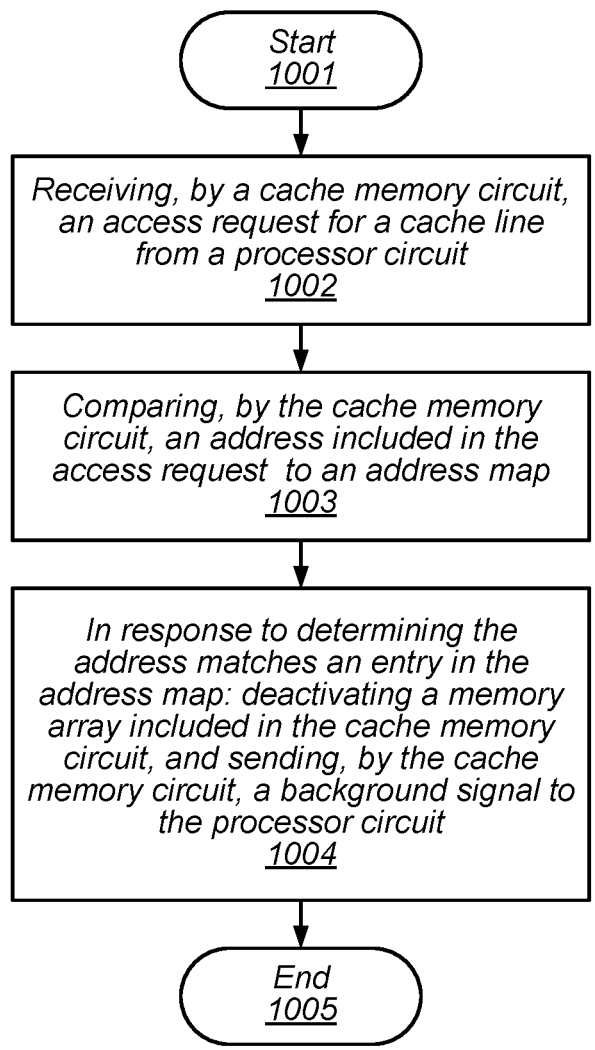
FIG. 10 illustrates a flow diagram depicting an embodiment of a method for retrieving data from a cache memory circuit.

Turning to FIG. 10, a flow diagram depicting an embodiment of a method for retrieving data from a cache memory circuit is illustrated. The method, which may be applied to cache memory circuit 100, begins in block 1001.

The method includes receiving, by a cache memory circuit, an access request for a cache line from a processor circuit (block 1002). In various embodiments, the access request specifies a read access request for data stored in a particular location in the cache memory circuit specified by an address. In some cases, the address may be a virtual address included in an address space used the processor circuit. The method may also include translating the virtual address to a corresponding physical address.

The method further includes comparing, by the cache memory circuit, an address included in the access request to an address map (block 1003). In various embodiments, comparing the address includes decoding a portion of the address and comparing a decoded portion of the address to respective status bits associated with the multiple rows included in a memory array included in the cache memory circuit. In various embodiments, the status bits encode information indicative of whether or not a given background data pattern is stored in a corresponding row.

The method also includes, in response to determining the address matches an entry in the address map, deactivating a memory array included in the cache memory circuit and sending, by the cache memory circuit, a background signal to the processor circuit (block 1004). In some cases, the background signal may include multiple bits whose value encodes which background data pattern was stored at a location in the cache memory circuit specified by the address. The method may further include decoding the background signal by the processor circuit. The method concludes in block 1005.

Figure 11:
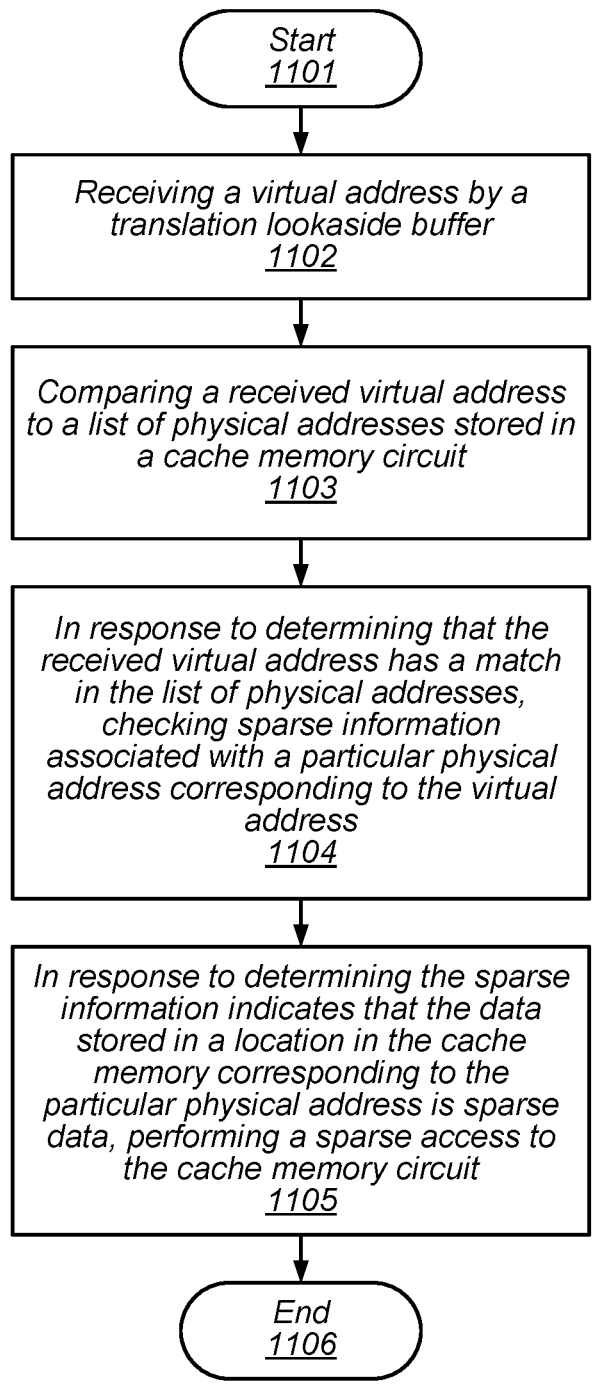
FIG. 11 illustrates a flow diagram depicting an embodiment of a method for operating a translation lookaside buffer.

Turning to FIG. 11, a flow diagram depicting an embodiment of a method for operating a translation lookaside buffer is illustrated. The method, which may be applied to translation lookaside buffer 602, begins in block 1101.

The method includes receiving a virtual address by a translation lookaside buffer (block 1102). In various embodiments, the virtual address may be included in a virtual address space used by a processor or processor core.

The method further includes comparing a received virtual address to a list of physical address stored in a cache memory circuit (block 1103). In various embodiments, the translation lookaside buffer may maintain at least a portion of an address map that maps virtual address to addresses in a physical address space used by the cache memory circuit or other memory circuit.

The method also includes, in response to determining that the received virtual address has a match in the list of addresses, checking status bits associated with a particular physical address corresponding to the virtual address (block 1104). In some cases, the status bits may be encoded in one or more bits associated with the particular physical address.

The method further includes, in response to determining that the status bits indicate that the data stored in a location in the cache memory corresponding to the particular physical address is background data, indicating a background access to the cache memory circuit (block 1105). In some cases, indicating a background access to the cache memory circuit may include activating a background signal. The method may also include halting, by the cache memory circuit, a read operation in response to receiving the background signal. The method concludes in block 1106.

In some cases, it may be desirable for a cache memory to obfuscate data it is sending to a processor circuit to increase security of instructions being sent to a processor circuit. Various methods, e.g., encrypting data prior to sending the data to the processor circuit, may be employed. Such methods can, however, increase latency and/or power consumption.

Figure 12:
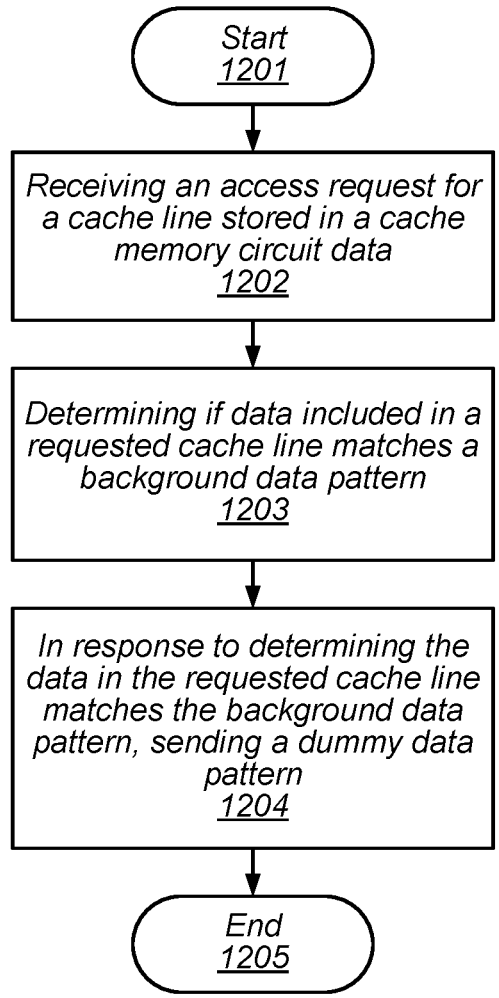
FIG. 12 illustrates a flow diagram depicting an embodiment of a method for a cache memory circuit sending dummy data.

A less costly alternative to the available methods of obfuscating data, can rely on the use of information regarding the storage of background data patterns in the cache memory circuit by sending a dummy data pattern instead of a background data pattern. Turning to FIG. 12, a flow diagram depicting an embodiment of a method for a cache memory circuit sending dummy data is illustrated. The method, which may be applied to various cache memory circuits (e.g., cache memory circuit 100), begins in block 1201.

The method includes receiving an access request for a cache line stored in a cache memory circuit (block 1202). The cache memory circuit may receive the access request from a processor or processor core. In various embodiments, the access request may include a virtual or physical address corresponding to the cache line.

The method further includes determining if data included in a requested cache line matches a background data pattern (block 1203). In some cases, determining if the data included in the requested cache line matches the background data pattern includes checking one or more status bits associated with a row included in a storage array included in the cache memory. Such status bits may indicate if an associated cache line is storing a given one of one or more background data patterns. In other embodiments, determining if the data included in the requested cache line matches the background data pattern includes comparing the address (either virtual or physical) to entries in an address map whose entries identify storage locations in the cache memory circuit that are storing a background data pattern.

The method also includes, in response to determining the data in the requested cache line matches a given one of the background data patterns, sending a corresponding dummy data pattern (block 1204). The method may further include activating a background data signal. In some cases, the background data signal may include multiple bits whose values may correspond to which background data pattern in stored in the request cache line. In various embodiments, each of the one or more background data patterns may have a corresponding dummy data pattern. By sending a corresponding dummy data pattern instead of the background data pattern included in the requested cache line, any monitoring of the communication between the cache memory circuit and the processor circuit will yield the dummy data pattern as opposed to actual data that may correspond to an instruction or data. The method concludes in block 1205.

Figure 13:
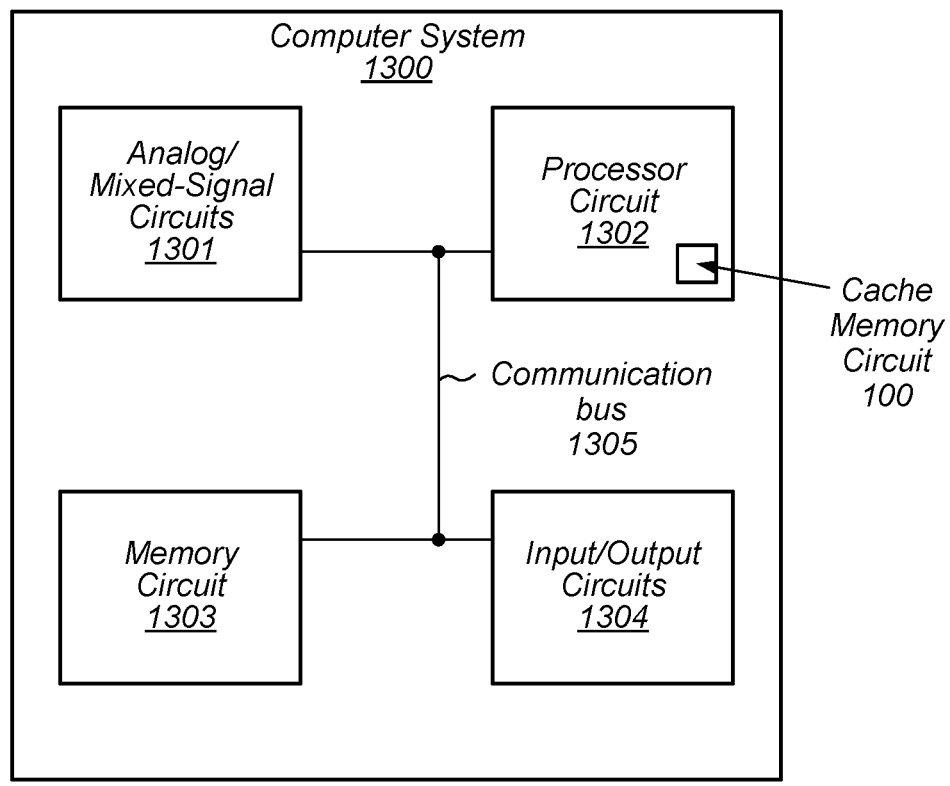
FIG. 13 illustrates a block diagram of an embodiment of a system-on-a-chip.

A block diagram of system-on-a-chip (SoC) is illustrated in FIG. 13. As illustrated, SoC 1300 includes analog/mixed-signal circuits 1301, processor circuit 1302, memory circuit 1303, and input/output circuits 1304, each of which is coupled to communication bus 1305. In various embodiments, SoC 1300 may be configured for use in a desktop computer, server, or in a mobile computing application such as, a tablet, laptop computer, or wearable computing device.

Analog/mixed-signal circuits 1301 may include a crystal oscillator circuit, a phase-locked loop circuit, an analog-to-digital converter (ADC) circuit, and a digital-to-analog converter (DAC) circuit (all not shown). In other embodiments, analog/mixed-signal circuits 1301 may be configured to perform power management tasks with the inclusion of on-chip power supplies and voltage regulators.

Processor circuit 1302 may, in various embodiments, be representative of a general-purpose processor that performs computational operations. For example, processor circuit 1302 may be a central processing unit (CPU), a graphics processing unit (GPU), a microcontroller, or the like, implemented as an application-specific integrated circuit (ASIC), a field-programmable gate array (FPGA), etc. In some embodiments, processor circuit 1302 may interface to analog/mixed-signal circuits 1301, memory circuit 1303, and input/output circuits 1304 via communication bus 1305.

As illustrated, processor circuit 1302 includes cache memory circuit 100 as depicted in FIG. 1. As described above, cache memory circuit 100 may be configured to use a background data pattern (or patterns) to determine candidate cache lines for eviction. It is noted that although processor circuit 1302 is depicted as including a single cache memory circuit, in other embodiments, processor circuit 1302 may include any suitable number of cache memory circuits with the features of cache memory circuit 100.

Memory circuit 1303 may in various embodiments, include any suitable type of memory such as a Dynamic Random-Access Memory (DRAM), a Static Random-Access Memory (SRAM), a Read-Only Memory (ROM), an Electrically Erasable Programmable Read-only Memory (EEPROM), or a non-volatile memory, for example. It is noted that in the embodiment of an SoC depicted in FIG. 8, a single memory circuit is depicted. In other embodiments, any suitable number of memory circuits may be employed.

Input/output circuits 1304 may be configured to coordinate data transfer between SoC 1300 and one or more peripheral devices. Such peripheral devices may include, without limitation, storage devices (e.g., magnetic or optical media-based storage devices including hard drives, tape drives, CD drives, DVD drives, etc.), audio processing subsystems, or any other suitable type of peripheral devices. In some embodiments, input/output circuits 1304 may be configured to implement a version of Universal Serial Bus (USB) protocol or IEEE 1394 (Firewire®) protocol.

Input/output circuits 1304 may also be configured to coordinate data transfer between SoC 1300 and one or more devices (e.g., other computing systems or integrated circuits) coupled to SoC 1300 via a network. In one embodiment, input/output circuits 1304 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, input/output circuits 1304 may be configured to implement multiple discrete network interface ports.

Figure 14:
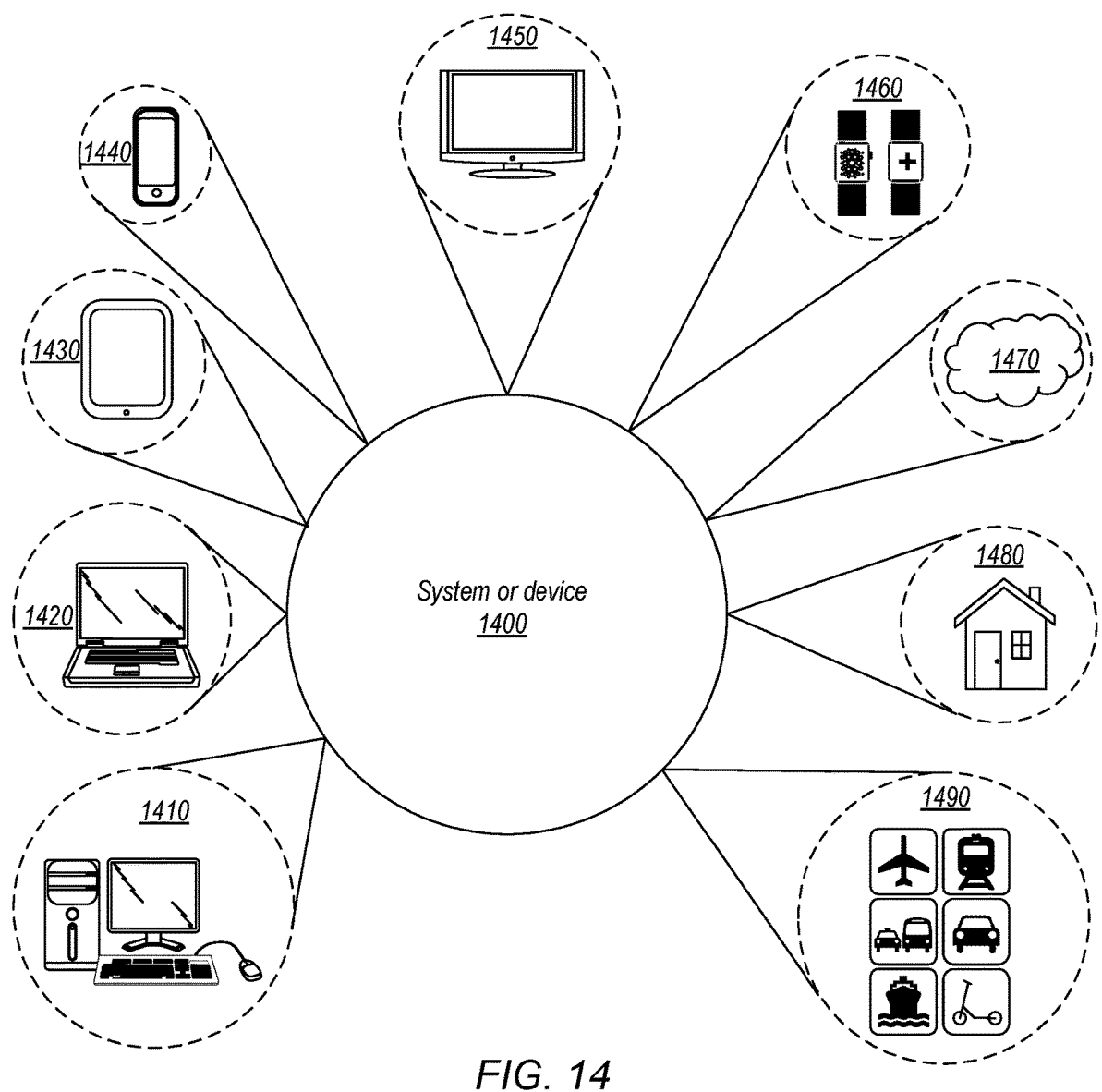
FIG. 14 illustrates a block diagram of an embodiment of a system.

Turning now to FIG. 14, various types of systems that may include any of the circuits, devices, or systems discussed above are illustrated. System or device 1400, which may incorporate or otherwise utilize one or more of the techniques described herein, may be utilized in a wide range of areas. For example, system or device 1400 may be utilized as part of the hardware of systems such as a desktop computer 1410, laptop computer 1420, tablet computer 1430, cellular or mobile phone 1440, or television 1450 (or set-top box coupled to a television).

Similarly, disclosed elements may be utilized in a wearable device 1460, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 1400 may also be used in various other contexts. For example, system or device 1400 may be utilized in the context of a server computer system, such as a dedicated server or on shared hardware that implements a cloud-based service 1470. Still further, system or device 1400 may be implemented in a wide range of specialized everyday devices, including devices 1480 commonly found in the home such as refrigerators, thermostats, security cameras, etc. The interconnection of such devices is often referred to as the "Internet of Things" (IoT). Elements may also be implemented in various modes of transportation. For example, system or device 1400 could be employed in the control systems, guidance systems, entertainment systems, etc. of various types of vehicles 1490.

The applications illustrated in FIG. 14 are merely exemplary and are not intended to limit the potential future applications of disclosed systems or devices. Other example applications include, without limitation: portable gaming devices, music players, data storage devices, unmanned aerial vehicles, etc.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. An apparatus, comprising:
   a memory circuit with a total address space that includes a physical address space and an extended address space, wherein the physical address space includes a pattern address space, and wherein addresses included in the pattern address space correspond to locations where a background data pattern is stored; and
   a control circuit configured to:
      receive a first read access request including a first read address; and
      in response to a determination that the first read address is included in the pattern address space, return the background data pattern while holding the memory circuit in an inactive state.

2. The apparatus of claim 1, wherein the control circuit is further configured to:
   receive a second read access request including a second read address; and
   in response to a determination that the second read address is included in the extended address space:
      translate the second read address to a corresponding address in the pattern address space; and
      initiate a read operation on the memory circuit using the corresponding address in the pattern address space.

3. The apparatus of claim 1, wherein the control circuit is further configured to:
   receive a write request including write data and a write address; and
   in response to a determination that the write data includes the background data pattern:
      store the write address in an address map; and
      hold the memory circuit in an inactive state.

4. The apparatus of claim 3, wherein to store the write address, the control circuit is further configured to update the address map to map the write address to a corresponding address within the pattern address space.

5. The apparatus of claim 1, wherein the memory circuit includes a cache memory circuit; and further comprising a translation lookaside buffer circuit configured to:
   store a virtual-to-physical address map;
   receive an access request including a virtual address;
   compare the virtual address to the virtual-to-physical address map; and
   in response to a determination that the virtual address corresponds to a physical address included in the pattern address space, activate a background control signal.

6. The apparatus of claim 5, wherein the cache memory circuit is configured, in response to an activation of the background control signal, to perform a background access, wherein a storage array included in the cache memory circuit is inactive.

7. A method, comprising:
   receiving, by a memory circuit, a first read access request including a first read address, wherein the memory circuit has a total address space that includes a physical address space and an extended address space, wherein the physical address space includes a pattern address space, and wherein addresses included in the pattern address space correspond to locations where a background data pattern is stored; and
   in response to determining that the first read address is included in the pattern address space, returning the background data pattern while holding the memory circuit in an inactive state.

8. The method of claim 7, further comprising:
   receiving, by the memory circuit, a second read access request including a second read address; and
   in response to determining that the second read address is included in the extended address space:
      translating the second read address to a corresponding address in the pattern address space; and
      initiating a read operation using the corresponding address in the pattern address space.

9. The method of claim 7, further comprising:
   receiving a write request including write data and a write address; and
   in response to determining that the write data includes the background data pattern:
      storing the write address in an address map; and
      holding the memory circuit in an inactive state.

10. The method of claim 9, wherein storing the write address includes updating the address map to map the write address to a corresponding address within the pattern address space.

11. The method of claim 7, further comprising:
   storing, by a translation lookaside buffer circuit, a virtual-to-physical address map;
   receiving, by the translation lookaside buffer circuit, an access request including a virtual address;
   comparing, by the translation lookaside buffer circuit, the virtual address to the virtual-to-physical address map; and
   in response to determining that the virtual address corresponds to a physical address included in the pattern address space, activating, by the translation lookaside buffer circuit, a background control signal.

12. The method of claim 11, wherein the memory circuit includes a cache memory circuit, and, further comprising, performing, by the cache memory circuit, a background access in response to an activation of the background control signal.

13. The method of claim 7, wherein the memory circuit includes a non-volatile memory circuit.

14. An apparatus, comprising:
a cache memory circuit that has a total address space that includes a physical address space and an extended address space, wherein the physical address space includes a pattern address space, wherein addresses included in the pattern address space correspond to locations where a background data pattern is stored, and wherein the cache memory circuit is configured to store a plurality of cache lines; and
a processor circuit configured to generate a first read access request including a first read address corresponding to a particular cache line of the plurality of cache lines; and
wherein the cache memory circuit is further configured to:
receive the first read access request that includes a first address;
in response to a determination that the first address is included in the pattern address space:
hold a memory array circuit included in the cache memory circuit in an inactive state; and
return the background data pattern.

15. The apparatus of claim 14, wherein the processor circuit is further configured to generate a second read access request including a second read address corresponding to a different cache line of the plurality of cache lines, and wherein the cache memory circuit is further configured to:
in response to a determination that the second read address is included in the extended address space:
translate the second read address to a corresponding address in the pattern address space; and
initiate a read operation for the memory array circuit using the corresponding address in the pattern address space.

16. The apparatus of claim 14, wherein the processor circuit is further configured to generate a write request including write data and a write address, wherein the cache memory circuit includes an address map, and wherein the cache memory circuit is further configured, in response to a determination that the write data includes the background data pattern, to:
store the write address in an address map; and
hold the memory array circuit in an inactive state.

17. The apparatus of claim 16, wherein the cache memory circuit is further configured to update the address map to map the write address to a corresponding address within the pattern address space as part of a pattern collection operation.

18. The apparatus of claim 17, wherein the cache memory circuit is further configured to perform the pattern collection operation in response to activation of a sleep mode.

19. The apparatus of claim 14, wherein the processor circuit is further configured to generate an access request that includes a virtual address, and, further comprising, a translation lookaside buffer circuit configured to:
store a virtual-to-physical address map;
receive the access request;
compare the virtual address to the virtual-to-physical address map; and
in response to a determination that the virtual address corresponds to a physical address included in the pattern address space, activate a background control signal.

20. The apparatus of claim 19, wherein the cache memory circuit is further configured to perform a background access in response to an activation of the background control signal.

* * * * *